United States Patent
Celeste

[11] Patent Number: 5,977,729
[45] Date of Patent: Nov. 2, 1999

[54] ELECTROCHEMICAL RADIAL CELL ENGINE

[76] Inventor: Salvatore Albert Celeste, 24 Elmwood Cir., Peabody, Mass. 01960

[21] Appl. No.: 08/779,050

[22] Filed: Jan. 6, 1997

[51] Int. Cl.⁶ ........................................................ H02P 1/00
[52] U.S. Cl. ........................................... 318/139; 310/68 E
[58] Field of Search ............................... 318/139, 9, 558; 310/40 R, 66, 67 R, 67 A, 68 R, 68 E

[56] References Cited

U.S. PATENT DOCUMENTS

| | | | |
|---|---|---|---|
| 5,226,207 | 7/1993 | Elzaurdia | 15/104.31 |
| 5,297,981 | 3/1994 | Maxim et al. | 446/437 |

*Primary Examiner*—David S. Martin
*Attorney, Agent, or Firm*—E. Lieberstein

[57] ABSTRACT

An electrochemical radial cell engine comprising an engine block, a motor supported by the engine block, at least one electrochemical reaction cell including a rotatable enclosure containing a source of anode material, preferably in the form of a multiplicity of anode particles, a fluid electrolyte, a cathode surrounding and radially spaced from the rotatable enclosure and means for rotating the rotatable enclosure in response to rotation of the motor. The enclosure should preferably be represented by a perforated cage having a mesh size large enough to pass fluid electrolyte. Rotation of the cage causes the anode particles to be compressed by centripetal forces which act upon the particles as the cage spins. This maximizes the operating efficiency of the electrochemical reaction cell(s) providing enhanced power for driving the engine.

23 Claims, 12 Drawing Sheets

ELECTROCHEMICAL RADIAL CELL ENGINE

FIELD OF THE INVENTION

This invention relates to an electrochemical engine having a motor, an engine block for supporting the motor and at least one electrochemical reaction cell providing power for the engine with the electrochemical reaction cell formed as an integral part of the engine and comprising a rotatable enclosure in the form of a cage having anode particles, fluid electrolyte and a cathode with the cathode being radially spaced from the cage and means in said engine for causing the enclosure to rotate to enhance the delivery of power to the engine.

BACKGROUND OF THE INVENTION

Prior art electrochemically driven engines utilize a passive battery system to provide an electrochemical source of power for the engine. The electrical capacity of the battery system which controls engine performance decreases during normal engine operation. Accordingly, research has been directed primarily to increasing the output capacity of the battery system and to recharging systems to repeatedly restore the battery system to its maximum capacity for reuse within a reasonable time period. The design of the engine was heretofore treated separately. Many of the problems attributable to the use of an electrochemical source of power for driving an engine are directly traceable to problems in the electrochemical power source (battery system) associated with oxide buildup, dendrite formation, gassing and passivation which reduce the electrical output discharge performance characteristic of the battery system and, in turn, materially affect engine operation and performance. To compensate against the degradation of battery capacity the conventional battery system needs to be continually recharged after relatively short intervals of usage to repeatedly restore the capacity of the battery well before the supply of anode and/or cathode material has been materially depleted.

The present engine design incorporates at least one electrochemical reaction cell as an integral part of the engine with the electrochemical reaction cell having a cathode, a rotatable enclosure containing a source of anode material and a source of fluid electrolyte. The rotatable enclosure is preferably a perforated cage and the source of anode material is preferably composed of a multiplicity of individual anode particles. Upon rotation of the cage containing the anode particles a dynamic interrelationship occurs between the operation of the engine and the operation of the electrochemical reaction cell. This dynamic interrelationship is caused by the rotation of the supply of anode particles relative to the cathode during engine operation and preferably in response to rotation of the engine motor. As the cage spins centrifugal (centripetal) forces compress the anode particles together and against the cage concomitantly with the electrochemical reaction process between the fluid electrolyte and the anode and cathode. Rotation of the cage causes a stratification to occur between anode particles which have oxidized and the non-oxidized anode particles so that only "fresh" anode particles, i.e. essentially non-oxidized particles, remain at the periphery of the cage adjacent to the cathode with the oxidized particles drawn toward the inner core of the cage. As a result of this stratification the formation of dendrites is inhibited and there is no loss in electrical contact between anode particles, particularly at the periphery of the cage, so that the interface spacing between the "fresh" anode particles and the cathode surface is maintained constant. The rotation of the cage also causes the fluid electrolyte to circulate through the space representing the interface between anode and cathode which has the effect of removing all electrochemical by-product contamination thereby keeping the surface of the anode particles at the periphery of the cage free of such contamination. Accordingly, the discharge characteristic of the electrochemical reaction cell (battery) does not drop off and instead remains substantially constant with engine power demand. As a result engine efficiency and performance does not degrade due to electrochemical inefficiency as in conventional electrochemical systems. Accordingly the radial engine of the present invention is able to sustain a high operating efficiency until almost complete exhaustion of the anode supply. In fact the electrochemical radial cell engine of the present invention operates at substantially close to maximum electrochemical efficiency without suffering substantial degradation in battery performance until the anode supply is essentially exhausted. Moreover, by integrating the electrochemical cell with the engine it is possible to provide auxiliary power in the form of both a source of alternating current, direct current and/or pulsating DC.

The electrochemical radial cell engine of the present invention provides an overall engine performance comparable to the performance of a conventional engine using conventional fossils fuels as their power source.

SUMMARY OF THE INVENTION

The electrochemical engine of the present invention broadly comprises an engine block, at least one electrochemical reaction cell having a rotatable enclosure preferably in the form of a cage containing a source of anode material, a fluid electrolyte, a cathode spaced apart from the enclosure to permit rotation of the enclosure relative to the cathode, a motor supported by the engine block and means for rotating the enclosure during rotation of the motor. The rotation of the cage maintains the anode material under compression due to centrifugal forces.

BRIEF DESCRIPTION OF THE DRAWINGS

Other objects and advantages of the present invention will become apparent from the following detailed description of the invention when read in conjunction with the accompanying drawings of which.

DETAILED DESCRIPTION OF THE INVENTION

Figure 1:
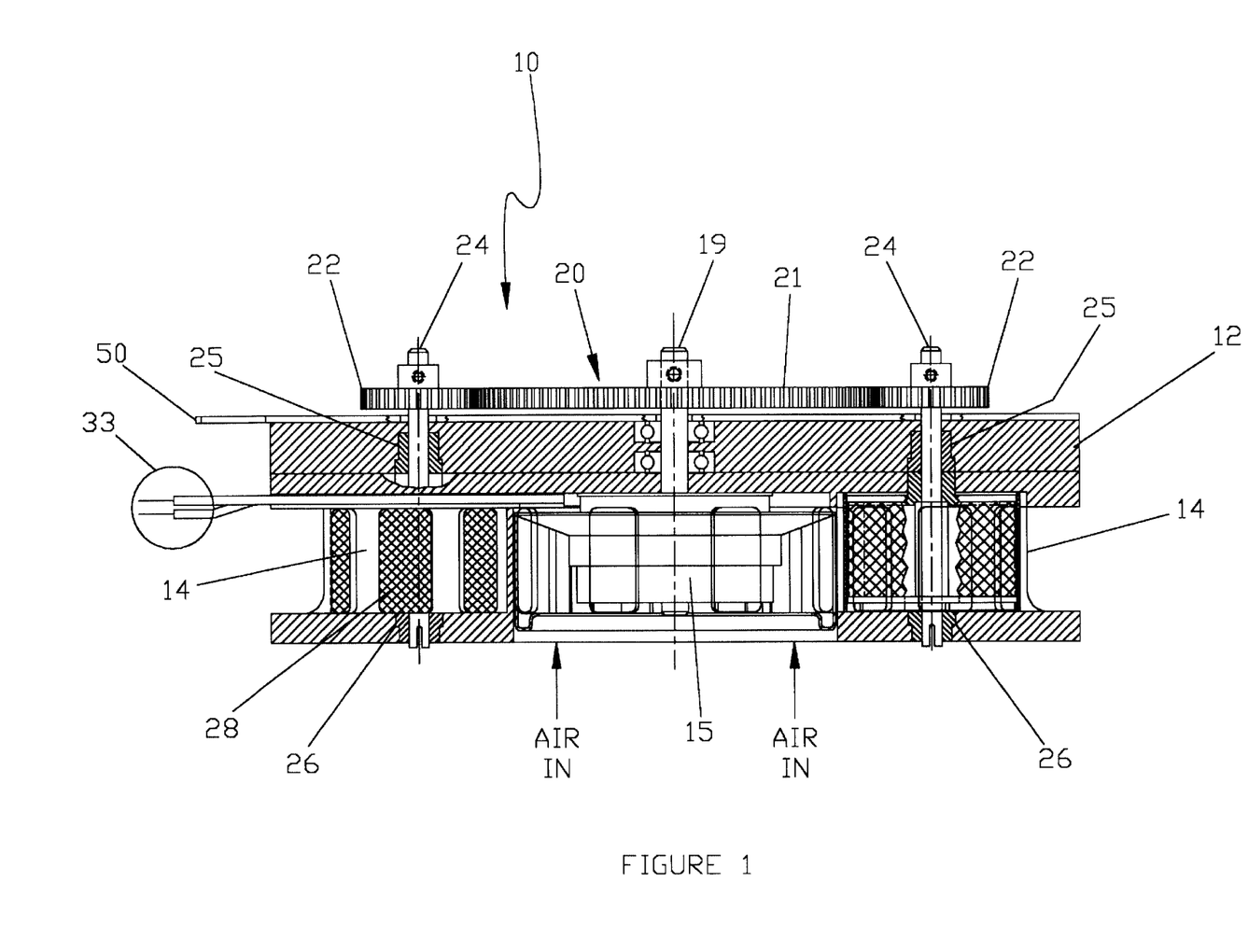
FIG. 1 is a side elevation in cross section of a preferred embodiment of the electrochemical engine of the present invention.
Figure 2:
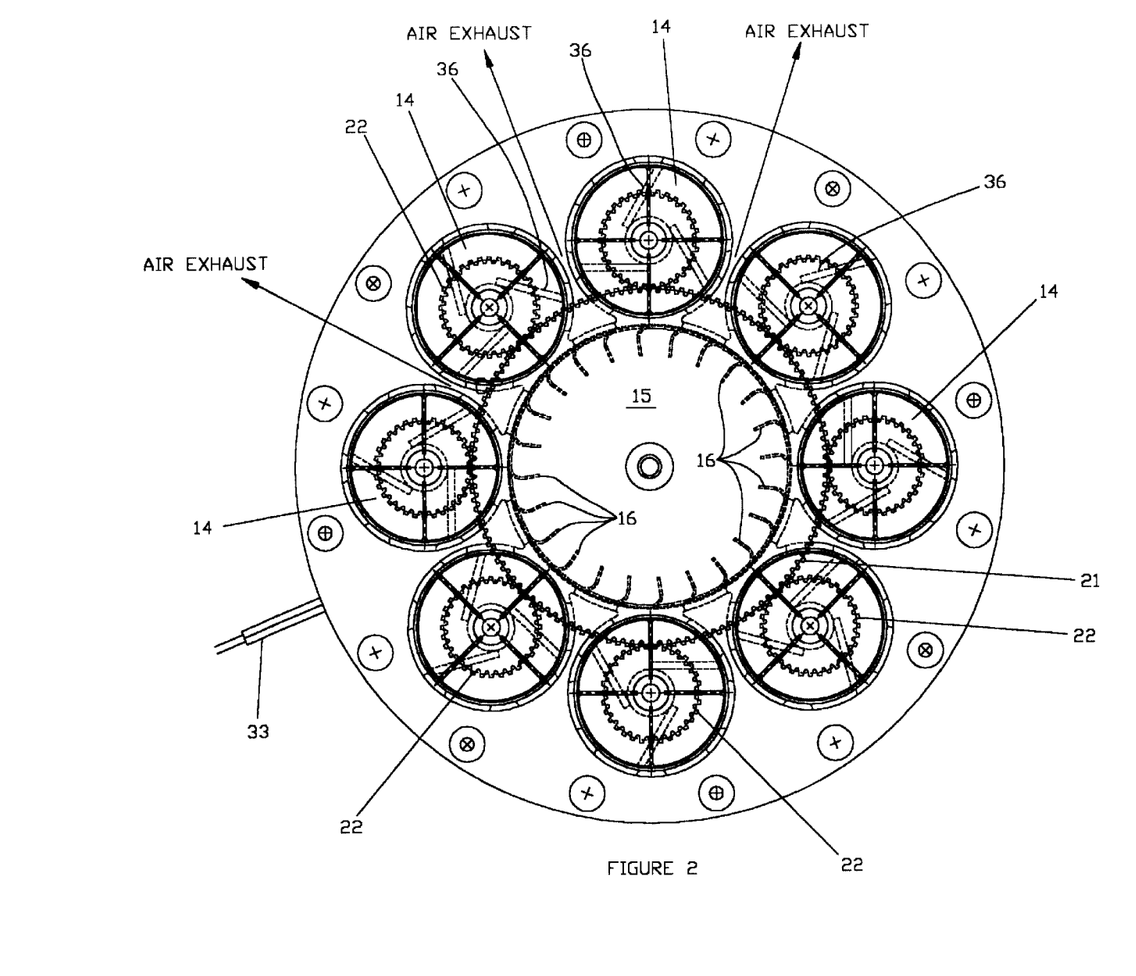
FIG. 2 is a top view of the electrochemical engine of FIG. 1.

Referring now to FIGS. 1–8 inclusive illustrating the preferred embodiment of the electrochemical radial cell engine 10 of the present invention which comprises an engine block 12, a plurality of electrochemical reaction cells 14, with each reaction cell 14 being supported by the engine block 12, and a motor 15. The plurality of electrochemical reaction cells 14 are arranged symmetrically around the motor 15 and preferably in a concentric arrangement. The motor 15 is of a conventional design such as a DC motor for operation with an electrochemical source of power. A fan (not shown) is mounted adjacent to the motor 15 with the fan having impeller vanes 16 as shown in FIG. 2 for drawing air through the engine 10 to cool the armature of the motor 15, exhaust hydrogen gas generated by the electrochemical reaction cells 14 and to provide an adequate supply of relatively high velocity air to the air cathodes 18 of the reaction cells 14. Air cathodes 18 are deployed in the preferred embodiment for the cathode component of the electrochemical reaction cells 14. However, it should be understood that the use of an air cathode is not essential to the present invention i.e, any conventional cathode may be used. The fan is driven by the motor 15 to draw and exhaust air through the engine 10 in accordance with a preferred air flow path as identified by arrows in FIGS. 1 and 2 respectively. The air is exhausted into the atmosphere. The air is preferably drawn from the atmosphere through the motor 15 so as to cool the motor armature windings (not shown) and then to follow a preferred path past the air cathodes 18 as shown in FIG. 2. By passing first through the motor 15 the air will be elevated somewhat in temperature before being directed past the air cathodes 18 into the atmosphere. The moving air not only supplies oxygen to the air cathodes 18 but also and provides a path to exhaust gas generated by the electrochemical reaction in the electrochemical reaction cells 14.

The motor 15 is connected to the main drive shaft 19 of the engine 10 which, in turn, is adapted to be connected to the transmission of a vehicle (not shown) or to the drive train of any other mechanism (not shown) which to be electrochemically driven by the engine 10 of the present invention.

A gear assembly 20 connects the main drive shaft 19 of the engine 10 to the electrochemical reaction cells 14. The gear assembly 20 includes a main fly gear 21 and a plurality of secondary slave gears 22 with each of the secondary slave gears 22 connected to a corresponding one of the plurality of electrochemical reaction cells 14 as is more specifically shown in FIG. 2. In the preferred embodiment of the present invention there exists eight (8) electrochemical reaction cells 14 and eight (8) corresponding secondary slave gears 22 with each reaction cell 14 having the same reference number and with each slave gear 22 having the same reference number for the sake of simplicity. Each one of the slave gears 22 is affixed to a separate cylindrical shaft 24 which, in turn, is connected through the engine block 12 to one of the electrochemical reaction cells 14. The slave gears 22 simultaneously rotate the enclosures 28 of the reaction cells 14 in response to the rotation of the main fly gear 21 so that each enclosure 28 will rotate about an axis through the shaft 24 coaxial with the longitudinal axis of the motor 15 and in a common direction with the rotation of the main drive shaft 19 of the engine 10. Each enclosure 28 contains the anode supply for the respective reaction cell 14. Although a gear arrangement is shown for rotating the enclosures 28 in response to the rotation of the main drive shaft 19 it should be obvious that the enclosures 28 may be rotated electromagnetically or by any other conventional mechanical or electromechanical arrangement. Stated otherwise the use of the gear arrangement 20 is not to be construed as essential to the invention.

Rotation of the enclosures 28 containing the anode supply for each of the electrochemical reaction cells 14 may also be initiated independent of the operation of motor 15 or in conjunction therewith e.g. the electrochemical reaction cells 14 may be independently rotated from an external source such as a solar cell or by other conventional means. The speed of rotation will depend upon the size of the engine 10 and is not critical to the present invention. However the enclosures 28 must be rotated at a speed which will create a centrifugal force sufficient to compress the anode particles within each enclosure 28. Each enclosure 28 should preferably be represented by a rotatable cage and will hereinafter for simplicity be referred to as a rotatable cage 28.

Figure 3:
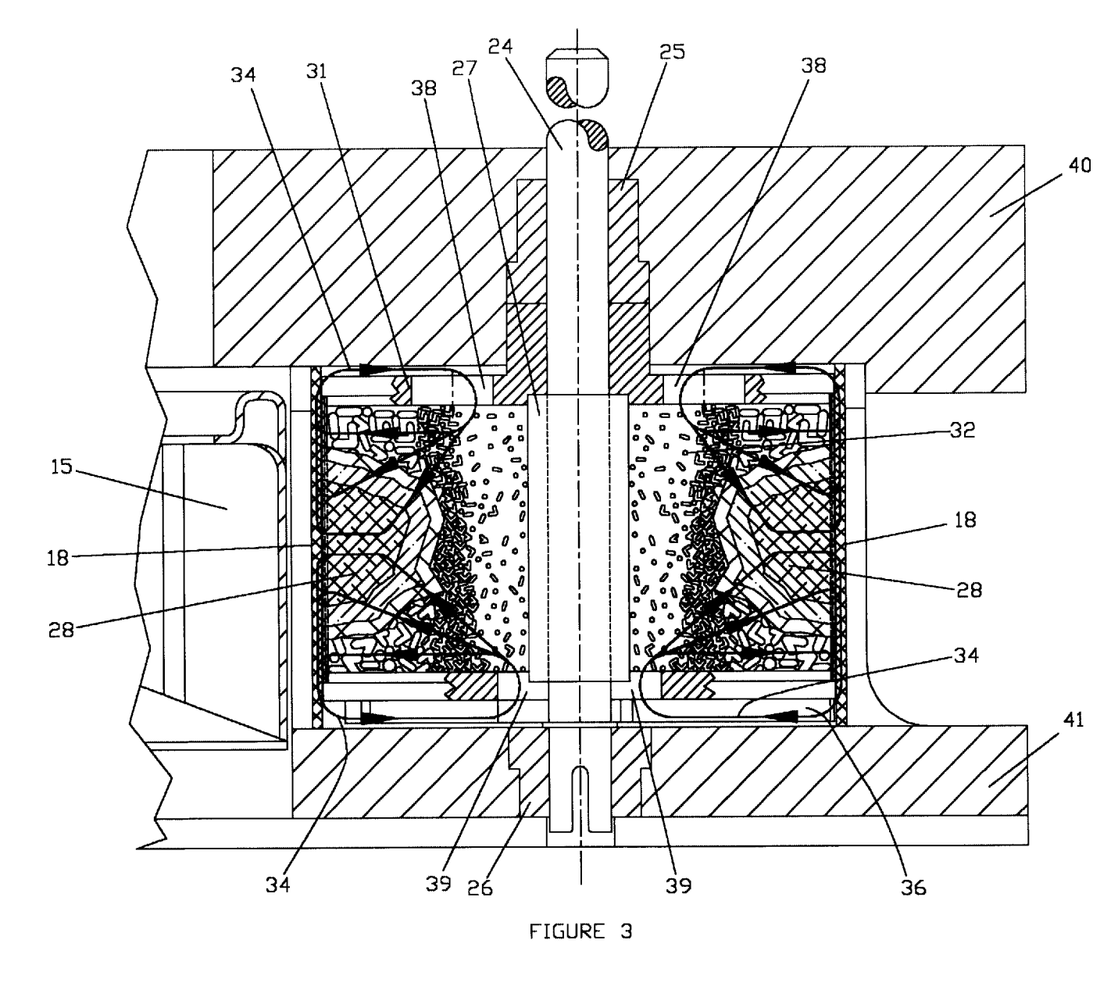
FIG. 3 is an enlargement of a section on the right hand side of FIG. 1 which magnifies the electrochemical reaction cell in the engine with part of the interior of the reaction cell exposed to show the anode particles and the flow pattern for fluid electrolyte.
Figure 4:
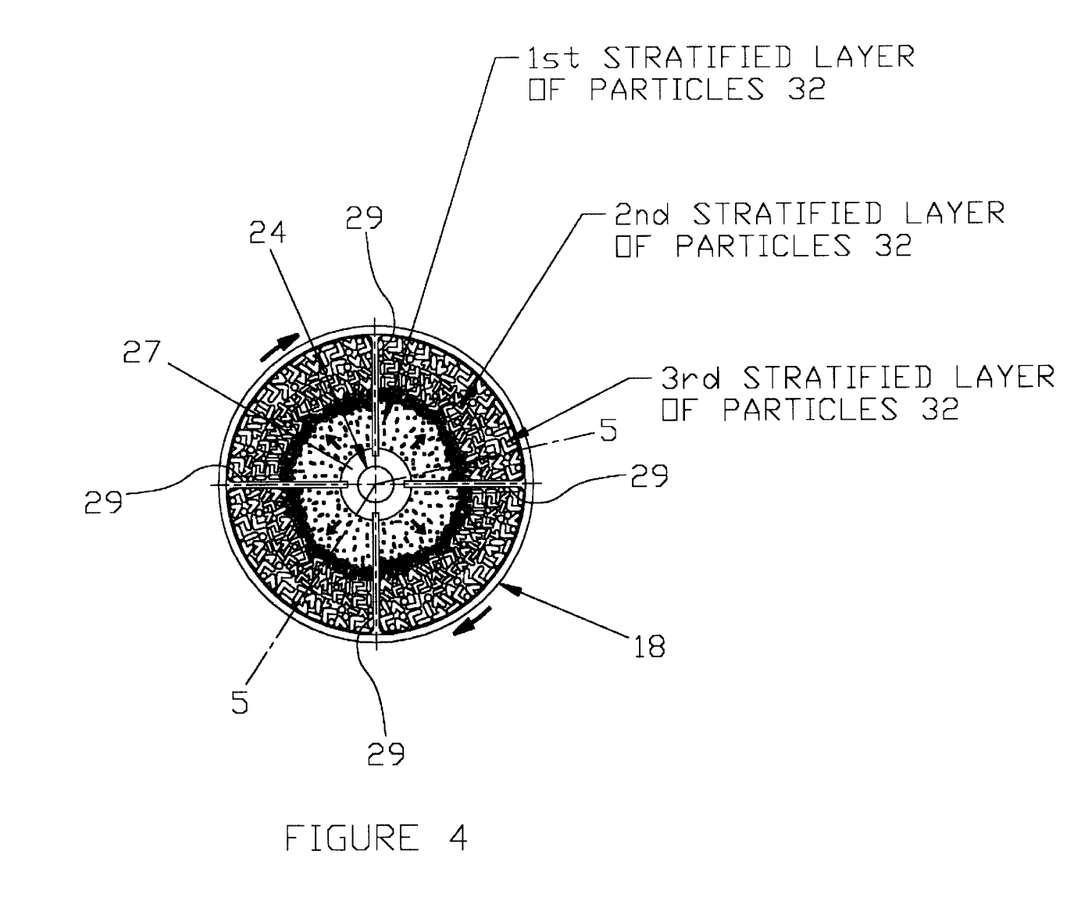
FIG. 4 is a top view of the electrochemical reaction cell of FIG. 3 taken along the lines 4—4 showing the stratification of the anode particles within the reaction cell.
Figure 5:
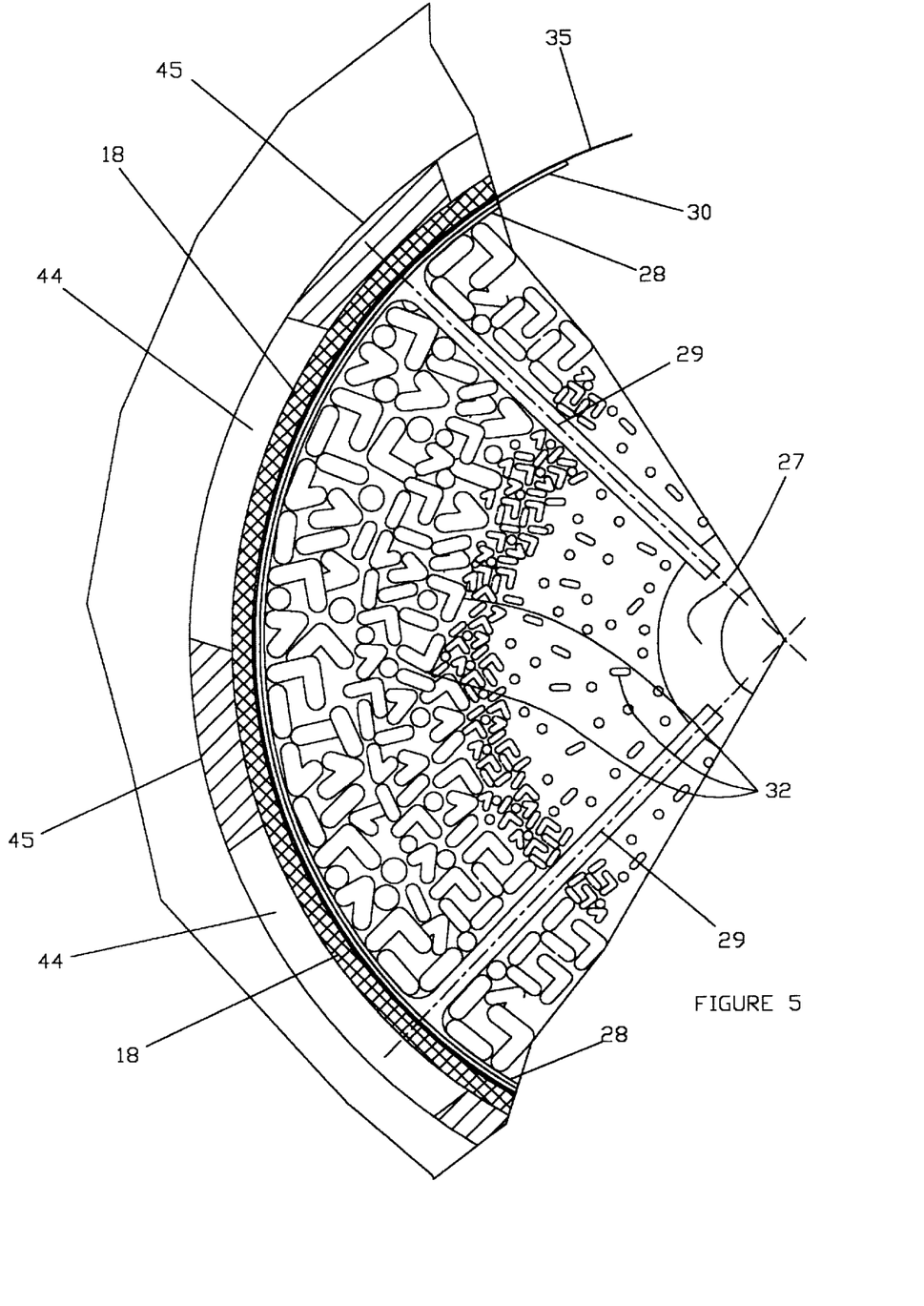
FIG. 5 is a magnified view of a radial sector of the electrochemical reaction cell in FIG. 4 taken along the lines 5—5 for showing the details of construction of the electrochemical reaction cell.

As shown in FIG. 1 and more particularly in FIG. 3 each shaft 24 is rotatably connected through bushing members 25 and 26 in the engine block 10 and is directly connected to a sleeve 27 forming the inner wall of the rotatable cage 28. The rotatable cage 28 is preferably of cylindrical configuration. The sleeve 27 is connected to the outer periphery of the rotatable cage 28 preferably by means of a plurality of radial dividers 29. End caps 31 and 33 are placed over the opposite ends of the rotatable cage 28 thereby forming an enclosure. It should be understood that the construction of the cage 28 does not require the use of the dividers 29. The rotatable cage 28 may be formed in any desired manner preferably from screening having a desired mesh size. The composition of the cage may be metal and more preferably brass although it may also be composed from an alloy. In addition to a metal mesh the cage 28 should preferably have a covering sheathe surrounding the metal mesh represented preferably by a porous permeable membrane 30. The rotatable cage 28 is filled with anode material preferably in the form of a multiplicity of anode granulated particles 32. FIG. 3 shows part of the cylindrical cage 28 removed exposing some of the anode particles 32 contained in the cage 28 whereas FIGS. 4 and 5 show the distribution of the anode particles 32 in the cage 28 during the electrochemical reaction process. The mesh size of the cage 28 must readily permit fluid electrolyte 34 to freely flow through the cage 28. Fluid electrolyte 34 preferably flows through each reaction cell 14 in the direction shown by the arrows in FIG. 3. The porous permeable membrane 30 which surrounds the screening of the cage 28 functions to contain the anode particles 32 within the cage 28 during rotation of the cage 28. The permeability of the membrane 30 must however be sufficient to permit the fluid electrolyte 34 to freely pass therethrough. The composition of the permeable membrane 30 is not critical to the invention and may be composed from any suitable polymeric material.

The cage 28 is separated from the cathode 18 by a space 35 of predetermined dimension. Upon rotation of the cage 28 the fluid electrolyte 34 is caused to circulate thought the cage 28 into the space 35 and then to pass through vent holes or passageways 38 and 39 located between the engine block 12 and the end caps 31 and 36 respectively forming a closed circulating loop as illustrated by the arrows in FIG. 3. The end caps 31 and 36 close the cage 28 to form an enclosure for the anode particles 32. The end cap 36 is also structured as an impeller as shown in FIG. 2 to assist in the controlled flow of the fluid electrolyte 34.

The cathode 18 is supported between an upper section 40 of the engine block 12 and a lower section 41. Although not shown a seal is formed between the assembly of the cathode 18 and the engine block 12 so that leakage of electrolyte 34 therebetween is prevented. The upper section 40 of the engine block 12 is readily removable from the engine 10 for assembling the electrochemical reaction cells 14, filling the cage 28 of each reaction cell 14 with electrolyte 34, replacing or substituting one or more of the electrochemical reaction cells 14 and for maintenance purposes.

The anode particles 32 are exposed through the screening of the cage 28 to the cathode 18. Upon rotation of the cage 28 the anode particles 32 appear to the cathode 18 as having a "virtually infinite surface area". "Virtually infinite surface area" is intended for purposes of the present disclosure to identify a surface area caused by a rotation of the anode particles 32 into concentric cylindrical orbits in response to the rotation of the cage 28 such that to the cathode 18 it appears as if each anode particle 32 has the surface area of the cylindrical orbit assumed by the particle. The spinning of the cage permits continuous electrochemical reaction of each particle as the particle spins in orbit causing reaction with the particle over a dynamic surface area for an entire revolution thus providing a "virtual surface area" for electrochemical activity much greater than the surface area actually provided by the particle were it a passive operation. Moreover, since a multiplicity of anode particles are present with each providing a substantially enlarged surface area this results in substantially enhancing the output discharge capacity of each reaction cell 14.

The cathode 18 is preferably of the same geometry as that of the cage 28 with the separation therebetween defining the space 35. In the preferred embodiments shown in the drawings both the cage 28 and cathode 18 are of cylindrical geometry thereby defining the space 35 as a radial space. Although the radial space 35 should be as small as possible its dimension will vary substantially in correspondence with the size of the engine 10.

Figure 6:
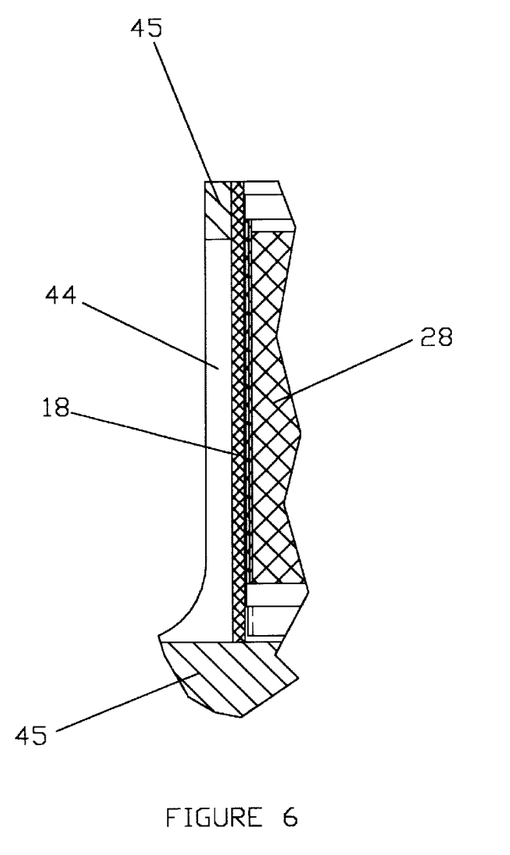
FIG. 6 is an enlarged view of the preferred air cathode assembly for each electrochemical reaction cell in the electrochemical engine of the present invention.
Figure 6A:
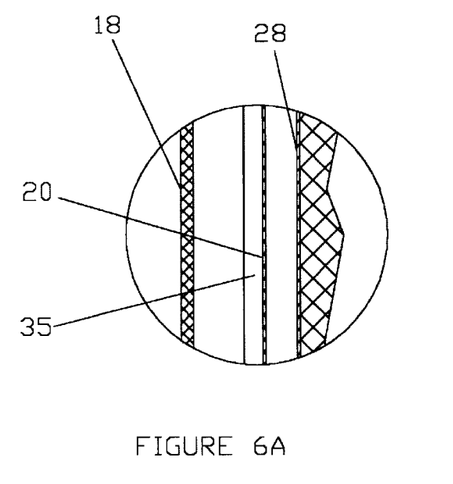
FIG. 6a is a magnified view of an encircled section of FIG. 6 which shows the space for fluid flow between the air cathode and the periphery of the cage containing the anode particles.

The anode particles 32 may be formed from any conventional anode material selected from the group including, for example, zinc, magnesium, aluminum, lithium etc. The size of the anode particles will vary with the size of the cage 28 which in turn depends upon the size of the engine 10. Any conventional aqueous electrolyte compatible with the selected material choice for anode and cathode may be used such as e.g. potassium hydroxide (KOH). Although the fluid electrolyte need not be aqueous an aqueous fluid electrolyte is preferred. The fluid electrolyte may be in the form of a liquid or may be microencapsulated or in a gelled composition. Any conventional material may be used for the cathode compatible with the choice of the anode material although an air cathode is preferred. An air cathode, as is well known in the art, is typically in the form of a sheet like member having opposite surfaces with one surface exposed to the atmosphere and the other surface exposed to the electrolyte in the cell such that during battery operation atmospheric oxygen dissociates while metal from the anode oxidizes to provide electron flow between the anode and cathode. The air cathode must contain an electrically conductive element and be permeable to air. An illustration of the air cathode 18 for the electrochemical radial cell engine of the present invention is shown in FIG. 6. The air cathode 18 is exposed to the atmosphere through ports 44 formed within a supporting plastic framework 45 connected to the manifold or engine block 12. The air cathode 18 should be substantially hydrophobic to the aqueous electrolyte so that aqueous electrolyte will not seep through. The surface of the air cathode 18 facing electrolyte is formed from active carbon containing finely divided hydrophobic polymeric material whereas the opposing surface is composed of a conductive element such as a metal screen and faces the atmosphere. FIG. 6a shows the space 35 for the flow of fluid electrolyte 34.

Rotation of each cage 28 generates a centripetal (centrifugal) force which compresses the anode particles 32 together and up against the periphery of the cage 28. This assures good electrical contact between the anode particles 32 and results in a stratification of the anode particles as shown in FIG. 4. The oxidized particles are displaced by the larger non-oxidized particles which move toward the periphery of the cage 28 while the displaced oxidized particles move toward the center of the cage 28. The stratification of particles as exemplified in FIG. 4 results in the smaller particles i.e. the oxidized anode particles and hydroxides congregating at the center or core section of the cage 28. Partially oxidized particles will congregate in a band at an intermediate position. The heavier non-oxidized anode particles 32 which did not significantly take part in the electrochemical reaction are forced to move toward the periphery of the cage 28. This results in assuring a "fresh" supply of anode particles 32 in contact with one another at the periphery of the cage 28. The rotation of the cage 28 also causes the fluid electrolyte 34 to circulate through the cage 28 and through the radial space 35 between the cathode 18 and cage 28. This causes removal of substantially all contaminates in the cathode/anode interface spacing 35 and keeps the surface of the anode particles 32 abutting the cage 28 clean. The displaced oxide particles at the center of the cage 28 form a core of oxide particles which act as a filter for the fluid electrolyte 34 within the closed fluid circulation path. Accordingly, the space 35 between the active "fresh" anode particles which are in close engagement with one another at the outer periphery of the cage 28 and the cathode surface is essentially constant. It should be understood that the space 35 in the present case is not only the physical space separating the cage 28 from the cathode 18 but is also an "interface space" between fresh active anode particles and the cathode. In conventional electrochemical systems the "interface space" between the closest non-oxidized particles and the cathode increases in dimension since the anode particles closest to the cathode oxidize first and essentially remain fixed in position. The electrolyte thickness is also essentially a constant. The result of all this is to essentially prevent passivation and the formation of dendrites and to cause the removal of substantially all oxides and by-products from the active anode and cathode interface surfaces. The constant removal of reaction-by-products from the anode/cathode interface by the circulating fluid electrolyte within the space 35 and the continual redistribution of anode particles 32 in the cage 28 in accordance with the teaching of the present invention dramatically minimizes ohmic effects by maintaining a low internal resistance thereby causing the power output to be substantially constant. This produces a level discharge characteristic for each of the electrochemical reaction cell 14 until the anode supply is substantially exhausted. Hydrogen gas is exhausted by the air flow current through the engine 10. Moreover because the anode particles 32 appear to the cathode 18 to constitute a virtually infinite surface area a much larger current density is produced relative to that obtainable from any conventional electrochemical battery source.

Figure 7:
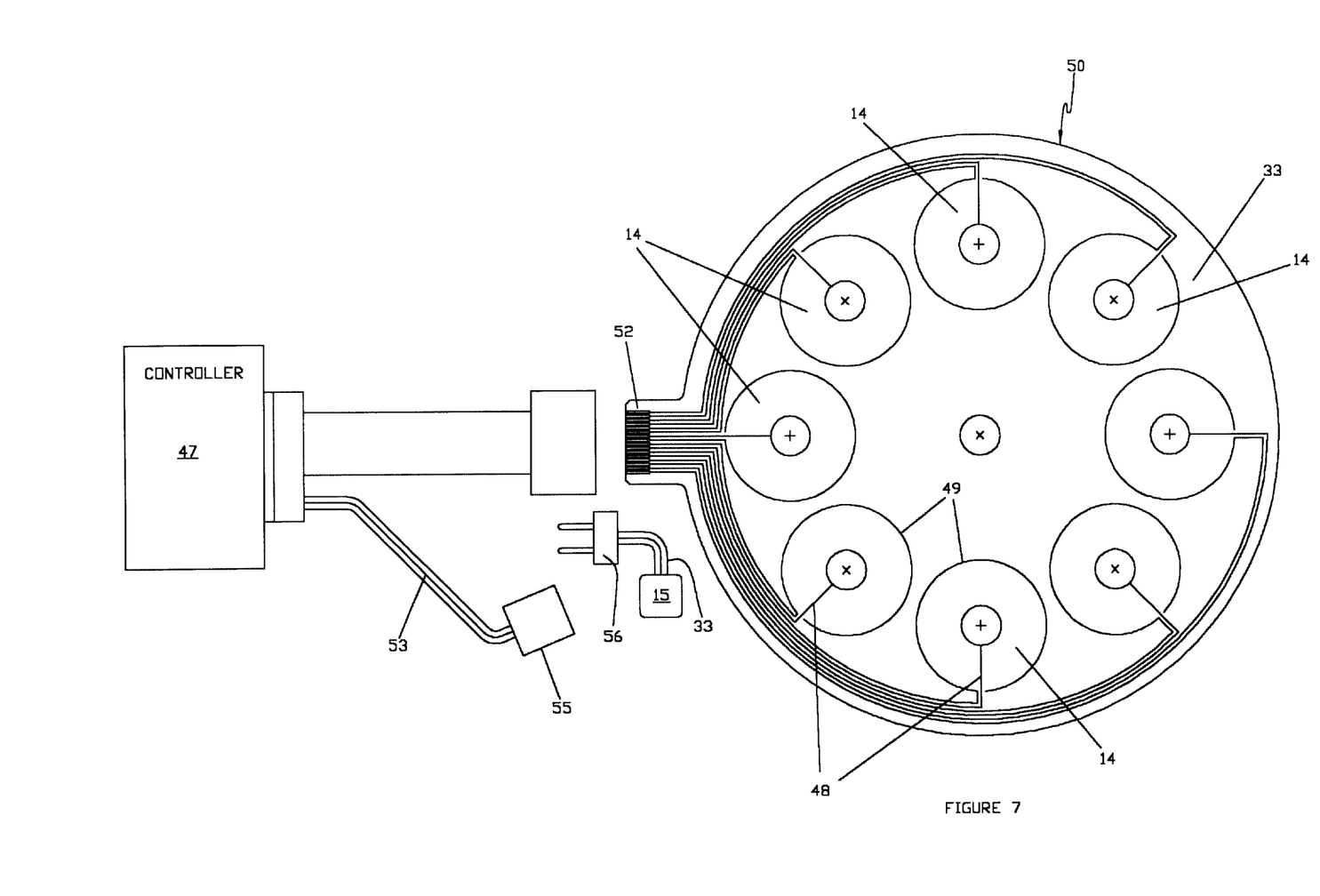
FIG. 7 is a schematic diagram of a printed circuit board showing the wiring interconnections between each of the electrochemical reaction cells and its interconnection preferably through a controller with the motor winding for the preferred electrochemical engine embodiment of the present invention.
Figure 8:
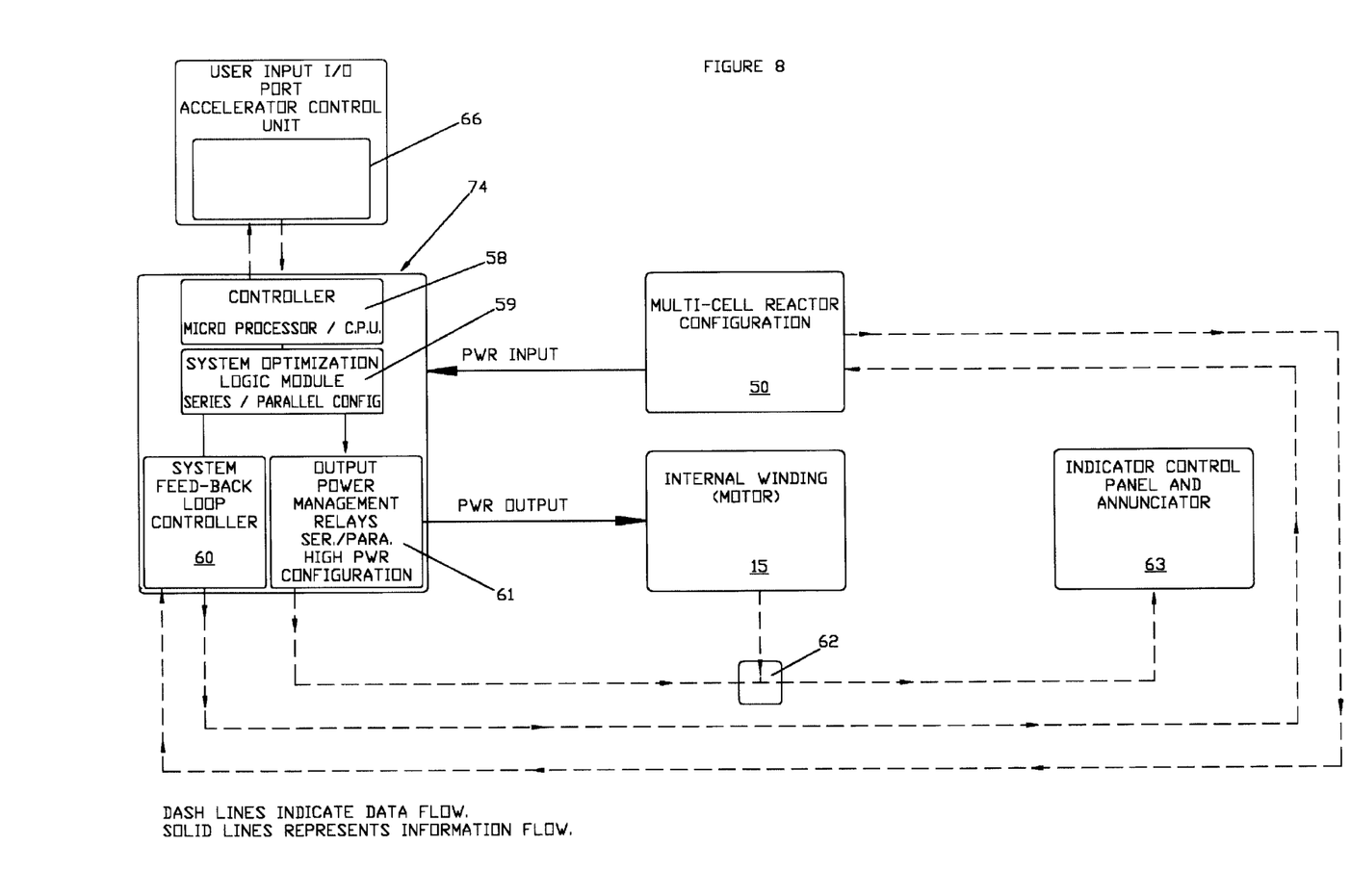
FIG. 8 is an electrical block diagram of the controller and printed circuit board in FIG. 7.

The electrochemical reaction cells 14 supply power to drive the engine 10. The power delivered to the engine 10 from the reaction cells 14 can be controlled by changing the electrical wiring configuration of the reaction cells 14 i.e., by changing the electrical wiring configuration between reaction cells 14 from a series or parallel configuration to a specified combination of series and parallel configuration. The wiring configuration between the reaction cells 15 may be controlled manually or may be fixed into different preset configurations corresponding to specified engine output requirements for different applications with adjustment through a switch or by automatic control. The preferred arrangement involves automatically varing the wiring configuration of the reaction cells 14 using a controller 47 as shown in FIGS. 7 and 8 respectively in response to engine power demand. The wiring of the reaction cells 14 is accomplished through a printed circuit board 50 which is interposed between the engine block 12 and the reactions cells 14 as shown in FIG. 1. The printed circuit board 50 is positioned to make contact with each electrochemical reaction cell 14 to provide an anode lead 48 for each reaction cell 14 and a corresponding cathode lead 49 for each reaction cell 14 respectively. The anode lead 49 may connect to the corresponding cage 28 of each reaction cell 14 or to the shaft 24 and the cathode lead 49 to the cathode 18. The printed circuit board 50 has an edge connector 52 which is connected to the controller 47. The controller 47 is also connected to a wiring cable 53 which has a receptacle 55 to which plug 56 is manually connected. The plug 56 is connected to the wiring leads 33 which lead directly to appropriate windings in the engine 10 such as the armature windings (not shown) of the motor 15.

The controller 47 as shown in FIG. 8 contains a microprocessor 58 which is programmed to rearrange the configuration of the reaction cells 14 to form a given series/parallel arrangement of reaction cells 14 which will optimize the output discharge characteristic of the engine 10 for any given set of engine operating conditions. The microprocessor 58 is connected to a logic module 59 representing an input/output modem for the microprocessor 58 to receives information from a feed back loop controller 60 which may itself be a microprocessor for receiving logic information from the printed circuit board 50 identifying the wiring configuration of the reaction cells 14. The logic module 59 and feed back loop controller 60 communicate with an output power relay unit 61 to provide power from the reaction cells to the motor 15. The output power relay unit 61 is preferably connected to a device 62 such as a speedometer and to an indicator control panel 63. The controller 47 is also connected to a user input/output accelerator control unit 65 which may also include operator override control 66. The user input/output accelerator control unit 65 provides information to the controller 47 to know how much power is being demanded by the engine 10 so that it can respond automatically by changing the wiring configuration of the reaction cells 14. The override control 66 enables an operator of the engine 10 to override the operation through, for example, a number of manually operated switches (not shown) indicative of certain situations in which normal operation from the accelerator control 66 should be overridden.

Initially, the electrochemical cells 14 may be used in a passive capacity to energize the motor 15 once the plug 56 is connected to the receptacle 55 thereby interconnecting the printed circuit board 50, controller 47 and motor 15. Although, in the passive state, the cages 28 are not revolving an electrochemical reaction will occur between the anode particles 32 and the cathode 18 in each of the reaction cells 14 to deliver power to motor 15 sufficient to intitiate rotation of the gear assembly 20 and, in turn, to start the rotation of each cage 28.

The electrochemical cells 14 may be recharged from any external source of power. Recharging from an external electrochemical source may be carried out simply by connecting the electrochemical cells 14 to an external source of power with the plug 56 from the motor 15 disconnected from the controller 47. It should however be understood that during normal engine operation recharging of the reaction cells occurs automatically when power is not demanded by the engine 10. In this regard the reaction cells 14 operate as a "fly wheel" when the engine does not draw power from the reaction cells 14. When the engine 10 is not drawing power the motor 15 operates as a generator for automatically recharging the reaction cells 14. By this recharging mechanism the mechanical energy stored in the reaction cells is substantially recaptured. There is also a gryroscopic effect due to the rotating mass of each reaction cell 14 which will stabilize the position of the engine keeping its attitiude essentially flat. During the recharging operation the oxidation process reverses and the oxide particles disassociate to cause a reformation of the anode particles. In fact as a result of the rotation of the cages 28 during recharge the recharging process is accelerated. A spent electrochemical reaction cell 14 may also be removed from the engine 10 by removing the upper section 40 of the engine block 10 and readily replaced with a new reaction cell 14.

Figure 9:
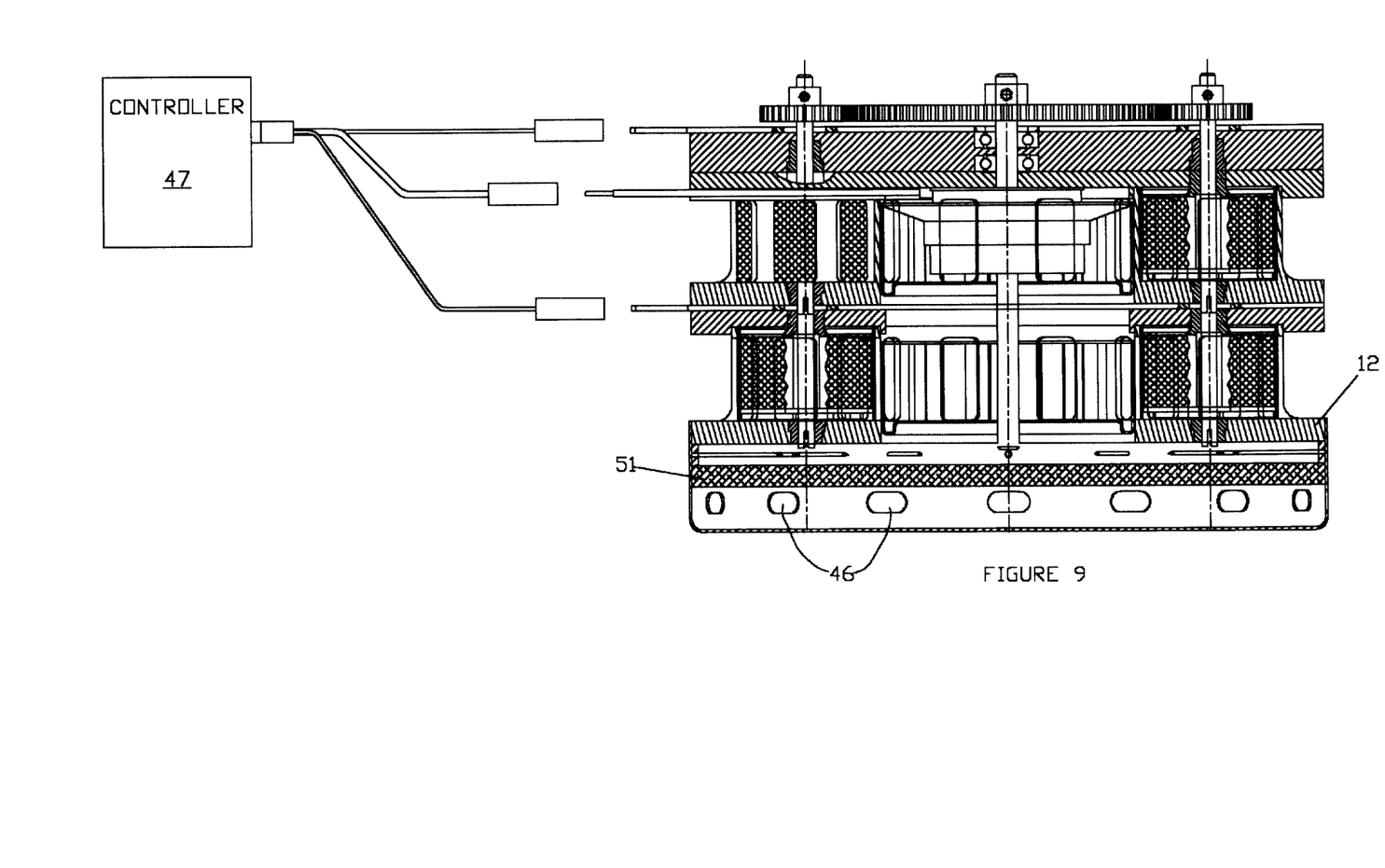
FIG. 9 is a side elevation in cross section of another embodiment of the present invention showing a tandem arrangement of electrochemical reaction cells.

The arrangement of reaction cells 14 in the embodiment of FIG. 1 may be modified as shown in FIG. 9 to include another set of reaction cells 14 mounted in tandum so as to double the number of reaction cells 14 with only a limited increase in the size of the engine 10. The controller 47 can provide better power control to the engine 10 with a larger number of electrochemical reaction cells 14. The engine block 12 for the arrangement in FIG. 9 includes a plurality of air intake ports 46 and an air filter 51.

Figure 10:
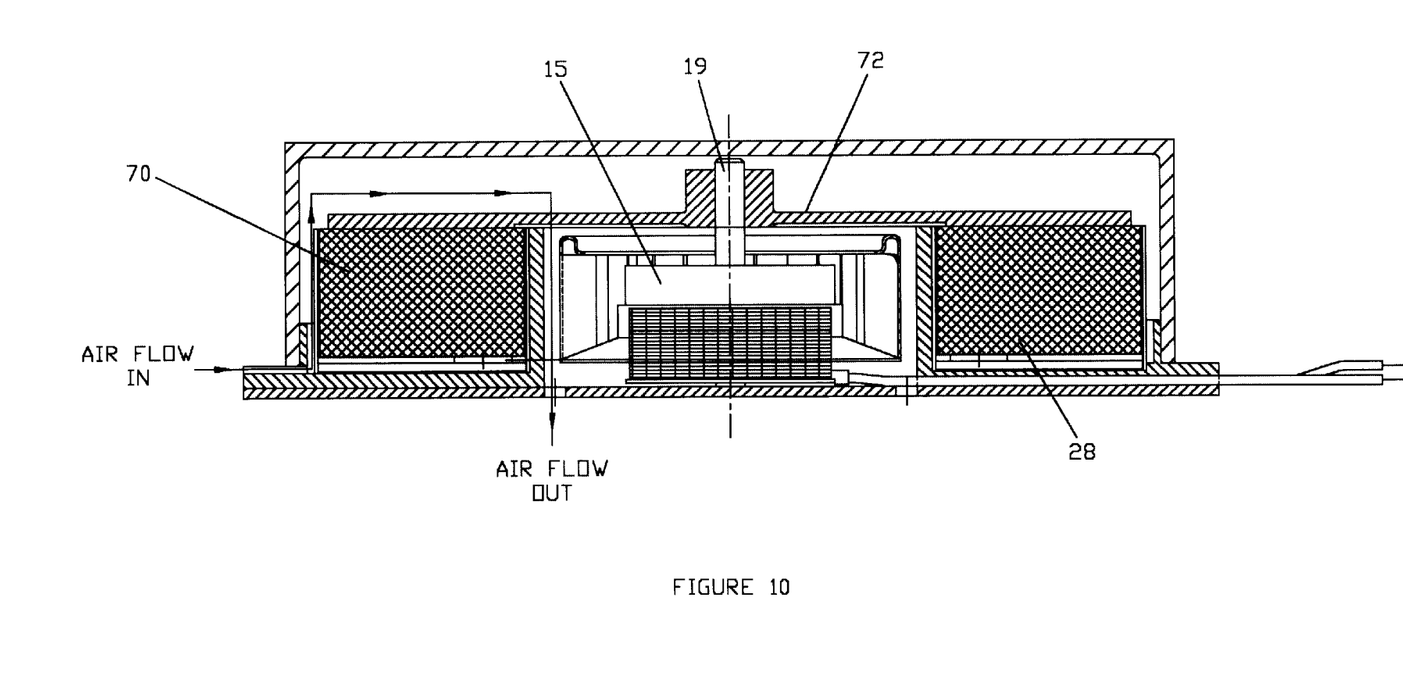
FIG. 10 is a cross sectional view of yet another embodiment of the electrochemical engine of the present invention having only a single electrochemical reaction cell.
Figure 11:
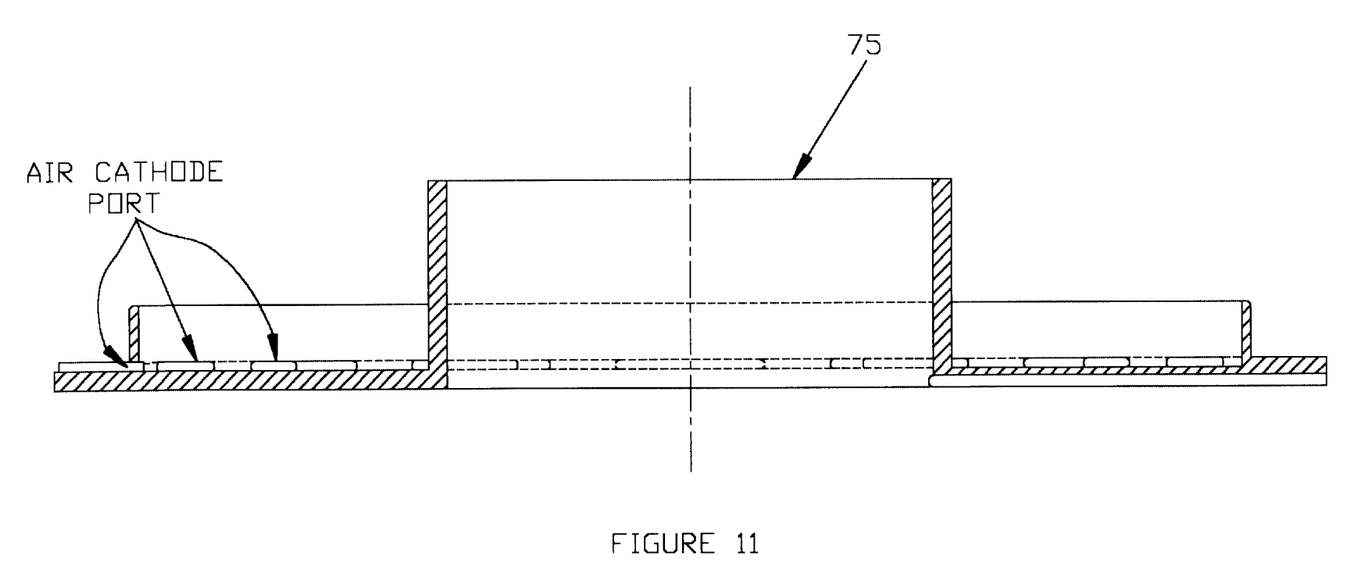
FIG. 11 is a magnified view of the air cathode assembly for the electrochemical reaction cell in the engine embodiment of FIG. 10.
Figure 12:
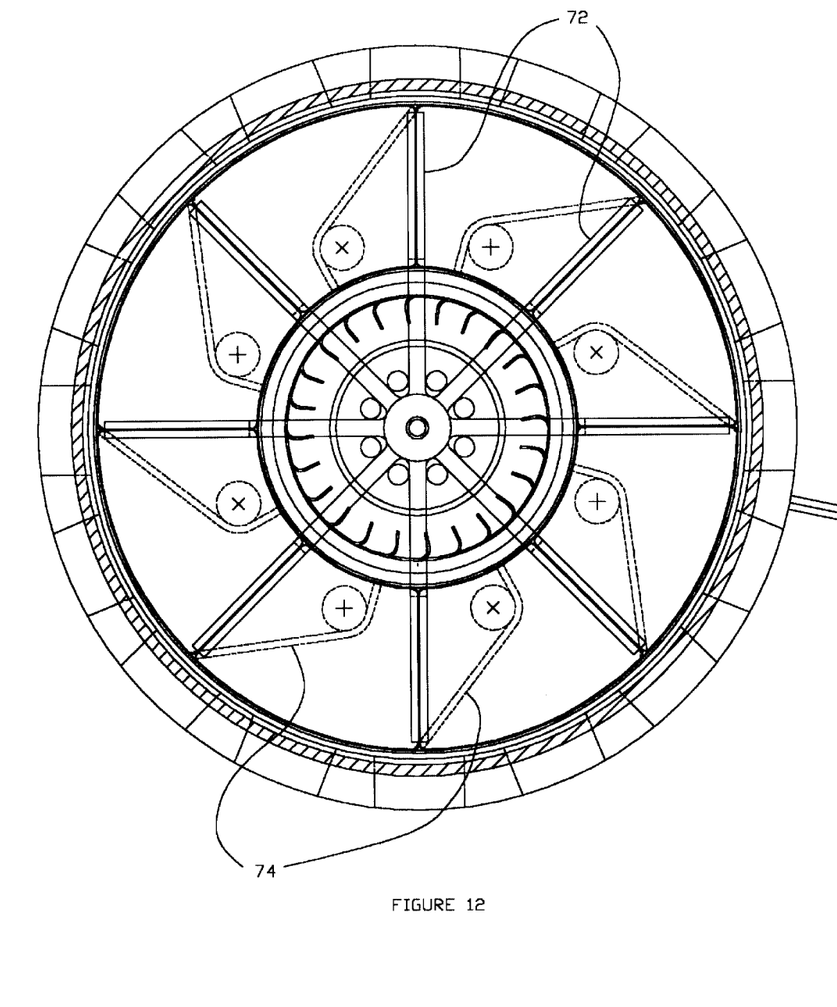
FIG. 12 is a top view of the electrochemical reaction cell in FIG. 10.

An alternate embodiment of the present invention is shown in FIGS. 10–12 employing a single electrochemical reaction cell 70 including a single rotating cage 28 filled with a multiplicity of anode particles 32 which operates functionally equivalent to the electrochemical cell 14. In this embodiment the electrochemical reaction cell 70 surrounds the motor 15 in a concentric arrangement with the main drive shaft 19 directly connected to the single reaction cell 70 through a hub 72 without the need for the gear assembly 20 of FIG. 1. As shown in FIG. 12 the hub 72 forms a carousel for rotating the cage 28 containing the anode particles 32. A plurality of vanes 74 are located at the bottom end of the cage 28 to assist in the control of the direction of flow of fluid electrolyte 34 through the cage 28 in a manner similar to that of FIG. 3 with the vanes 74 being functionally equivalent in operation to the vanes 36. For simplicity, identical reference numbers are used to identify components in FIG. 10 which are identical to their counterparts in FIG. 1. As such the construction of the cage 28 is not elaborated upon. However, the air cathode 75 which is functionally equivalent to air cathode 18 is designed for to permit an air flow intake and air flow exhaust through the engine 10 as shown in FIGS. 10 and 11 respectively. In this embodiment the motor 15 and rotatable cage 28 rotate in unison and at the same speed. The motor 15 includes an intake fan 16 which is directly connected to the motor 15 in the same manner as shown in FIG. 1 such that air is drawn into the engine 10 from the atmosphere and is forced to take a path around the air cathode 75. The embodiment of FIG. 10 operates in a manner substantially equivalent to the embodiment of FIG. 1 in that when the motor 15 is energized the cage 28 rotates to compress the anode particles 32 against one another and against the cage 28.

What we claim is:

1. An electrochemical radial cell engine comprising an engine block, a motor supported by the engine block and at least one electrochemical reaction cell having a rotatable enclosure containing a source of anode material, a fluid electrolyte, a cathode spaced apart from the enclosure to permit rotation of the enclosure relative to the cathode, and means for rotating the enclosure during rotation of the motor.

2. An electrochemical radial cell engine as defined in claim 1 wherein said rotatable enclosure is in the form of a cage rotatable within said engine.

3. An electrochemical radial cell engine as defined in claim 2 wherein said cathode and rotatable cage are each of cylindrical geometry and wherein the space between said cathode and anode is radial.

4. An electrochemical radial cell engine as defined in claim 3 wherein the source of anode material is a multiplicity of anode particles maintained under compression during the rotation of said cage by centrifugal force.

5. An electrochemical radial cell engine as defined in claim 4 wherein said rotatable cage has an outer periphery composed of a conductive material in the form of a screen.

6. An electrochemical radial cell engine as defined in claim 5 wherein said screen is covered by a fluid permeable membrane which permits fluid electrolyte to pass therethrough.

7. An electrochemical radial cell engine as defined in claim 4 wherein said cathode is an air cathode.

8. An electrochemical radial cell engine as defined in claim 7 wherein the composition of said anode particles are selected from the group consisting of: group 1, 2 and 3 of the periodic table and alloys thereof.

9. An electrochemical radial cell engine as defined in claim 3 wherein the source of anode material is mercury.

10. An electrochemical radial cell engine as defined in claim 8 wherein said engine block and said electrochemical cell form a sealed enclosure for said fluid electrolyte with said fluid electrolyte having a closed circulation path extending through said rotatable cage and around said radial space.

11. An electrochemical radial cell engine as defined in claim 10 wherein said radial space is constant in radial dimension around the periphery of said cage.

12. An electrochemical radial cell engine as defined in claim 11 further comprising a fan coupled to said motor for directing air through said motor and through said air cathode.

13. An electrochemical radial cell engine as defined in claim 12 wherein air is directed to flow first through said motor and then past said air cathode before being exhausted into the atmosphere.

14. An electrochemical radial cell engine as defined in claim 12 wherein said motor is either a DC or AC motor.

15. An electrochemical radial cell engine as defined in claim 8 further comprising a plurality of electrochemical cells arranged symmetrically around said motor.

16. An electrochemical radial cell engine as defined in claim 15 wherein said motor has a drive shaft in common with the drive shaft for said engine and said plurality of electrochemical cells are connected to the drive shaft of said motor.

17. An electrochemical radial cell engine as defined in claim 16 further comprising a gear assembly for connecting said plurality of electrochemical cells to said motor.

18. An electrochemical radial cell engine as defined in claim 17 wherein said gear assembly comprises a main gear and a plurality of slave gears with each slave gear connected to the rotatable cage.

19. An electrochemical radial cell engine as defined in claim 8 including only one electrochemical cell arranged concentrically about said motor and connected directly thereto.

20. An electrochemical radial cell engine as defined in claim 14 wherein said plurality of reaction cells are electrically connected in a configuration represented by a series, parallel or a combination of series and parallel connections.

21. An electrochemical radial cell engine as defined in claim 20 further comprising a controller for automatically arranging the electrical configuration of said plurality of reaction cells in response to engine demand.

22. An electrochemical radial cell engine as defined in claim 20 wherein said plurality of reaction cells are electrically connected to a common printed circuit board.

23. An electrochemical radial cell engine as defined in claim 1 having a first set of a plurality of electrochemical reaction cells arranged symmetrically about said motor and a second set of electrochemical reaction cells arranged in tandem with said first set.

\* \* \* \* \*